United States Patent [19]

Okumura

[11] Patent Number: 4,884,875
[45] Date of Patent: Dec. 5, 1989

[54] LIQUID CRYSTAL LIGHT VALVE SHOWING AN IMPROVED DISPLAY CONTRAST

[75] Inventor: Fujio Okumura, Tokyo, Japan
[73] Assignee: NEC Corporation, Tokyo, Japan
[21] Appl. No.: 254,022
[22] Filed: Oct. 6, 1988

[30] Foreign Application Priority Data

Oct. 6, 1987 [JP] Japan .................................. 62-252783

[51] Int. Cl.⁴ ............................................... G02F 1/13
[52] U.S. Cl. ..................................... 350/342; 350/333;
350/336; 340/765; 340/784; 340/805
[58] Field of Search ............... 350/332, 333, 336, 342;
340/765, 784, 805

[56] References Cited

U.S. PATENT DOCUMENTS

| | | | |
|---|---|---|---|
| 4,432,611 | 2/1984 | Wei | 350/333 X |
| 4,534,622 | 8/1985 | Harada et al. | 350/333 X |
| 4,653,860 | 3/1987 | Hendrix | 350/333 X |
| 4,655,552 | 4/1987 | Togashi et al. | 350/342 |
| 4,655,554 | 4/1987 | Armitage | 350/342 X |
| 4,679,909 | 7/1987 | Hamada et al. | 350/333 |
| 4,693,561 | 9/1987 | Ashley | 350/342 X |

OTHER PUBLICATIONS

"Application of the Liquid Crystal Light Valve to Real-Time Optical Data Processing", Bleha et al., "Optical Engineering", vol. 17, No. 4 Jul.-Aug. 1978, pp. 371–384.

Primary Examiner—Stanley D. Miller
Assistant Examiner—Richard Gallivan
Attorney, Agent, or Firm—Burns, Doane, Swecker & Mathis

[57] ABSTRACT

A light-addressed liquid crystal light valve comprises a transparent insulating substrate having either one-dimensional or two-dimensional arrays of light switching elements thereon which can perform switching with an incident light, another opposing transparent substrate having transparent electrodes and a liquid crystal sandwiched therebetween. Each of the light switching elements comprises a voltage divider circuit and an inverter circuit. The voltage divider circuit comprises a photoconductor element and a resistor element. The inverter circuit receives as input the voltage divided by the voltage divider circuit, while the output voltage from the inverter circuit is applied to one pixel electrode for the liquid crystal.

5 Claims, 6 Drawing Sheets

LIQUID CRYSTAL LIGHT VALVE SHOWING AN IMPROVED DISPLAY CONTRAST

BACKGROUND OF THE INVENTION

This invention relates to a liquid crystal light valve and, more particularly, to a light-addressed liquid crystal light valve.

Liquid crystal light valve (LCLV) is an optical switching element used for light projection display, optical data processing, etc. An article entitled "Application of the Liquid Crystal Light Valve to Real-Time Optical Data Processing" by W. P. Bleha et al., in "Optical Engineering", vol. 17, No. 4, July-August, 1978, pp. 371-384 discloses a light-addressed LCLV wherein the device is embodied by sandwiching a film structure of a cadmium sulfide (CdS) photoconductor film, a cadmium telluride (CdTe) light-absorbing film, a multilayered reflection film and a liquid crystal between transparent conductor films formed on a pair of transparent substrates respectively. When a predetermined ac voltage is applied between the transparent conductive films, the liquid crystal is impressed with a partial voltage divided by equivalent capacitors of liquid crystal, multilayered reflection film, CdTe film, and CdS film. When signal light comes in from the transparent substrate on the side of the CdS film, the resistance of the illuminated portion of the CdS film becomes lowered to thereby increase the partial voltage applied to the liquid crystal. The reflection of the projection light incident to the substrate on the side of liquid crystal is varied by controlling the molecular alignment of liquid crystal with the changes in applied voltage.

The foregoing prior art LCLV has at least two problems.

One problem is the difficulty in obtaining a sufficient display contrast at a high level. As mentioned above, the partial voltage applied to the liquid crystal is divided by equivalent capacitors of the multilayered reflection films and so on. Therefore, even if the capacity of CdS film is varied extensively, the voltage applied on a capacitor of the liquid crystal would not change proportionally. As the variation in partial voltage is small, a display contrast cannot be set beyond 5-8.

Another problem is the difficulty in manufacture which also requires time consuming process. To increase the variation of the divided partial voltage, the thickness of CdS film must be made sufficiently thick. However, as will be discussed in more detail hereinafter, it is not easy to form a thick CdS film.

SUMMARY OF THE INVENTION

An object of this invention is to provide an LCLV which can achieve a high contrast and which can be manufactured simply.

According to this invention, a liquid crystal light valve comprises a transparent insulating substrate having either one-dimensional or two-dimensional arrays of light switching elements thereon which can perform switching with an incident light, another opposing transparent substrate having transparent electrodes and a liquid crystal sandwiched therebetween. Each of the light switching elements comprises a voltage divider circuit and an inverter circuit. The voltage divider circuit comprises a photoconductor element and a resistor element. The inverter circuit receives as input the voltage divided by the voltage divider circuit, while the output voltage from the inverter circuit is applied to one pixel electrode for the liquid crystal.

DESCRIPTION OF THE PREFERRED EMBODIMENTS

Figure 1A:
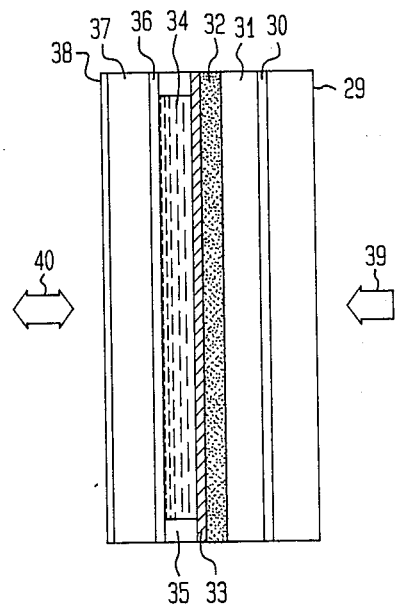
FIG. 1A shows a sectional view of a prior art light-addressed LCLV.
Figure 1B:
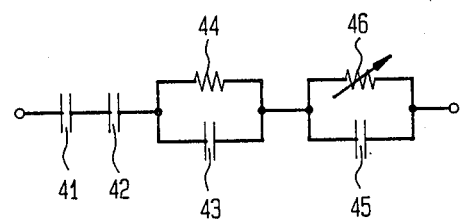
FIG. 1B shows an equivalent circuit diagram of the LCLV shown in FIG. 1A.

Before describing embodiments of this invention, a prior art light-addressed LCLV will be explained in detail by referring to FIGS. 1A and 1B. On a rear glass substrate 29 are formed successively a transparent conductive film 30, a CdS photoconductor film 31, a CdTe light absorbing film 32, and a multilayered reflector film 33 comprising insulating films of different refractive indices. Liquid crystal 34 is sandwiched between the multilayered reflector film 33 and a transparent conductor film 36 formed on a front glass substrate 37 via a spacer 35. Although not shown in the drawings, there is provided orientation alignment film of liquid crystal so as to contact the liquid crystal. There is provided a polarizing plate 38 on the outer surface of the front glass substrate 37. The signal light 39 enters from the side of the rear glass plate 29 while the projection light 40 comes from the side of the polarizing plate 38. The equivalent circuit of the LCLV comprises, as shown in FIG. 1B, the equivalent capacitor 41 of the liquid crystal, the equivalent capacitor 42 of the multilayered reflector film, the equivalent capacitor 43 of the CdTe film 32 and the equivalent capacitor 45 of the CdS film 31 which are connected in series. The equivalent resistor 44 of the CdTe film 32 is connected in parallel to the CdTe capacitor 43 while the equivalent resistor 46 of the CdS film 31 is connected to the CdS capacitor 45 in parallel. When the opposing transparent conductor films 30 and 36 are applied with a given ac voltage, the liquid crystal 34 is impressed with the voltage substantially divided by the four equivalent capacitors 41, 42, 43, and 45. The equivalent resistors 44 and 46 are negligible in dark condition, because the resistance of CdTe film 32 and CdS film 31, i.e., the equivalent resistors 44 and 46 are extremely high. When the signal light 39 comes from the side of the rear glass substrate 29, the resistance of illuminated CdS film 31 becomes lowered. In other words, the resistance in the equivalent resistor 46 becomes smaller. Therefore, the capacitor 45 is substantially short-circuited to increase the voltage applied to the equivalent capacitor 41 of the liquid crystal 34. The molecular array of liquid crystal 34 is controlled by the applied voltage to thereby vary the reflection of the projection light 40 which comes in from the side of the front glass substrate 37. The role of the light absorbing film 32 is to prevent the projection light 40 from reaching the CdS photoconductor film 31.

As is obvious from the equivalent circuit shown in FIG. 1B, the capacitor 45 should be sufficiently smaller than the capacitor 41 of the liquid crystal 34 in order to sufficiently increase the change in voltage applied to the capacitor 41 of the liquid crystal 34. For this purpose, the thickness of the CdS film 31 should be sufficiently large. It is, however, not easy to form a thick CdS film 31. It is usually necessary to set the thickness of CdS film 31 in the range of 15-20 microns, and to polish the same during the process of film forming in order to form the film completely speckle-free. The film is usually formed by the sputtering process which takes 10 to 20 hours to form the film of the above thickness including polishing. Moreover, the formations of CdTe film and a multilayered insulating film of about 2 micron thickness are additionally required. This means a considerable time expense is required to form an element completely.

As explained in relation to the operational principle, because the voltage applied to the liquid crystal capacity 41 is divided by the capacitors 42, 43, and 45 of CdS film 31, CdTe film 32, and multilayered reflector film 33, even if the capacitor 45 of the multilayered reflector film 33 changes by a larger margin, the voltage applied to the liquid crystal capacitor 41 would not be changed that much. As the change in voltage remains within a small scope, the display contrast cannot be increased beyond the ranges of 5 to 8.

Description will now be given to preferred embodiments of a LCLV according to this invention which is free of the aforementioned defects of the prior art LCLVs and which can be made simply and yet can achieve a higher contrast. Referring to the equivalent circuit shown in FIG. 2, one pixel of LCLV comprises a photoconductor member 1 of which resistance varies by light, and a resistor member 2 which is insensitive to light, and each of the photoconductor members 1 is serially connected to an end of the resistor member 2 on an end thereof at a node designated by X. A drain of a thin film transistor 3 for loading is connected to the source of another thin film transistor 4 for switching at a node designated by Y, which in turn is connected to the transparent electrode 24 of one pixel. In other words, the nodes X and Y are input and output terminals of the inverter circuit. The other end of the photoconductor member 1 and the source and gate of the loading transistor 3 are connected commonly to a high voltage terminal 7. The other end of the resistor 2 and the drain of the switching transistor 4 are connected commonly to a low voltage terminal 6. The gate of the switching transistor 4 is connected to the resistor 2 of the photoconductor member 1 at the node X.

Figure 2:
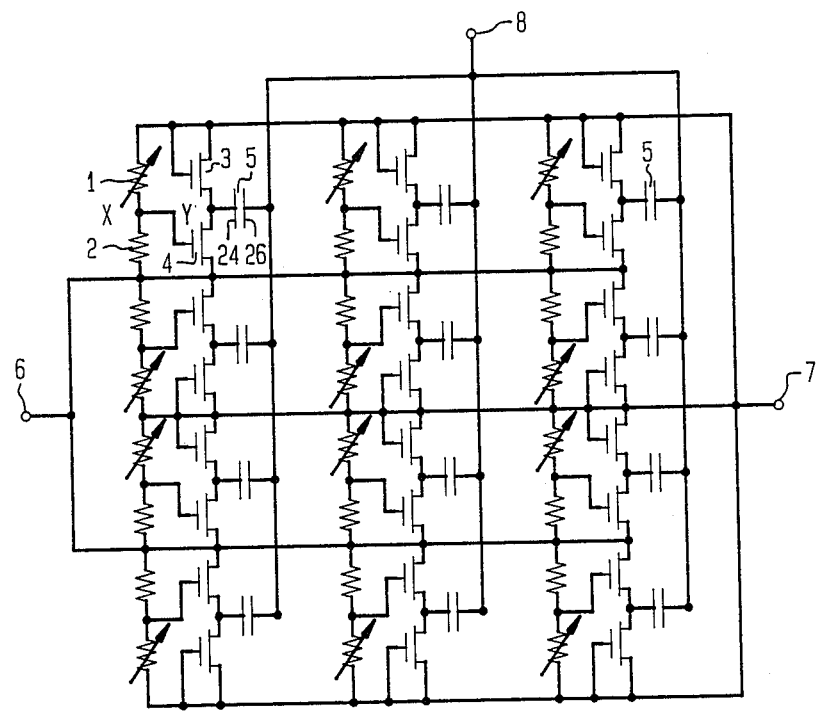
FIG. 2 shows an equivalent circuit diagram of an embodiment of the LCLV according to this invention.

FIG. 2 shows an example of matrix alignment where 12 pixels are arranged in four rows and three columns. The above-stated structure is included in each pixel on the rear substrate. The loading transistor 3 and the switching transistor 4 in each pixel form an inverter circuit while the photoconductive member 1 and the resistor member 2 form a voltage divider circuit. The reference numeral 8 denotes a common electrode terminal connected to common electrode 26 formed on the front substrate.

Figure 3A:
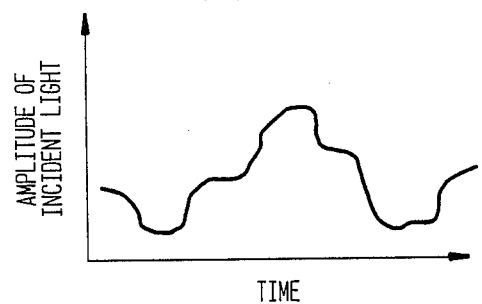
FIGS. 3A through 3C show explanatory views for the operational principle of this invention.
Figure 3B:
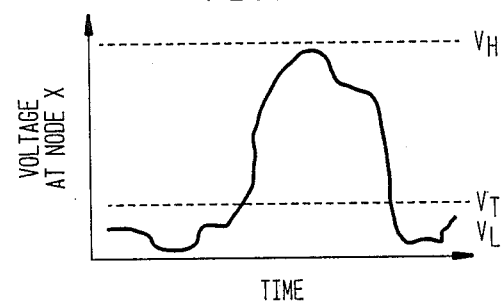
Figure 3C:
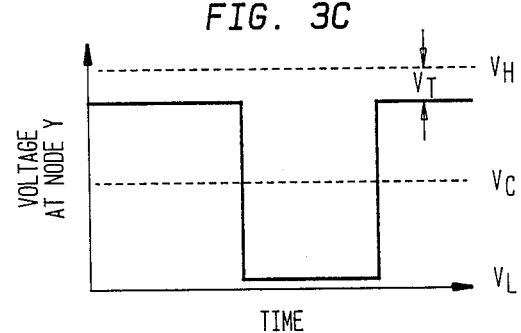

FIG. 3 is referred to describe the operational principle. Electric voltage which is determinable by the low voltage terminal 6 and the high voltage terminal 7 is applied on the voltage divider circuit comprising the photoconductor member 1 and the resistor 2. When the intensity of the incident light from the rear substrate changes as shown in FIG. 3A, the resistance of the photoconductive member 1 changes, and thus the potential at the node X changes as shown in FIG. 3B. If the resistance of the photoconductor 1 in dark condition without any incident light is sufficiently larger than that of the resistor 2, then the potential at the node X would approach closer to the potential $V_L$ of the low voltage terminal 6. The resistance of the photoconductor 1 is made sufficiently smaller than that of the resistor 2 when illuminated with a sufficiently large amount of incident light, the potential at the node X approaches closer to the potential $V_H$ of the high voltage terminal 7. The switching transistor 4 may be turned ON or OFF by adjusting the potential at the node X in a manner to allow passage through the threshold $V_T$ of the transistor 4 which is connected to the node X. The potential of the output from the inverter circuit comprising a loading transistor 3 and a switching transistor 4 or the potential at the node Y changes as shown in FIG. 3C. When the transistor 4 is in the OFF-state with a small amount of incident light and with the potential at the node X lower than the threshold voltage thereof, the potential at the node Y becomes smaller than the potential of the high voltage terminal 7 by the values equivalent to the threshold voltage of the transistor 3. If the voltage $V_C$ to be applied to the common electrode 26 is set at the value of $(V_H-V_T)/2$, the voltage of this level would be applied to the liquid crystal cell 5 either in positive or in negative value depending on the intensity of the light. This enables variation in voltage applied to the liquid crystal cell which is larger than the prior art LCLV.

Figure 4:
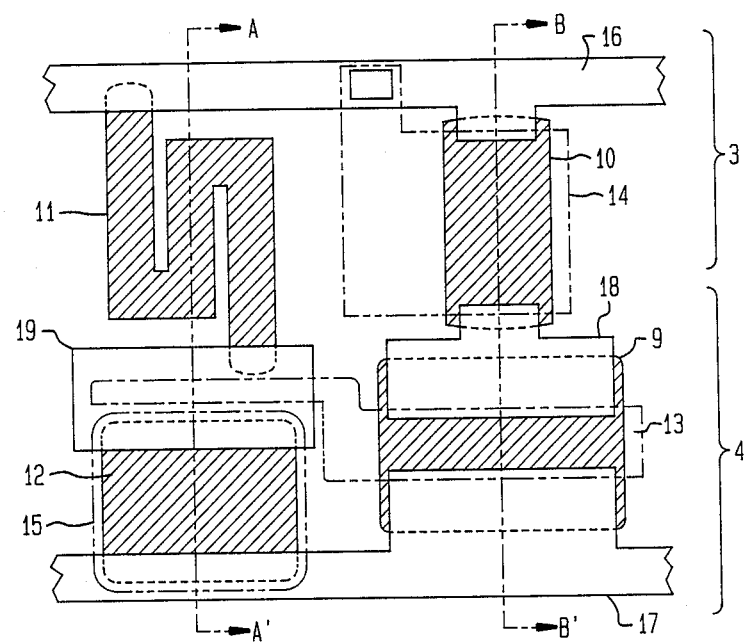
FIG. 4 shows a plane view of component element patterns for one pixel of the embodiment of LCLV according to this invention.
Figure 5A:
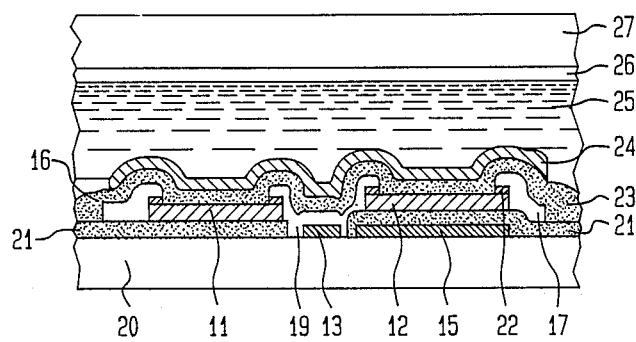
FIG. 5A shows a sectional view of FIG. 4 along the line A—A'.
Figure 5B:
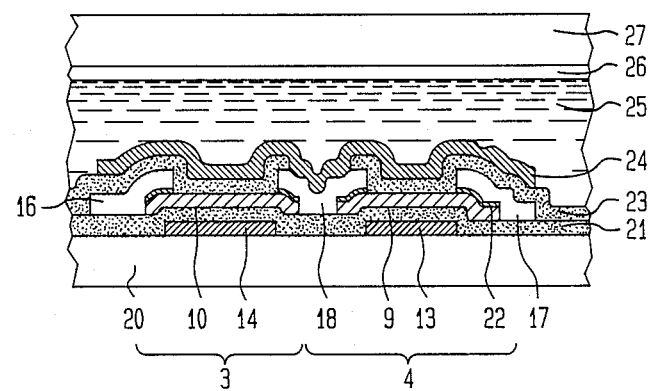
FIG. 5B shows a sectional view of FIG. 4 along the line B—B'.

Referring to FIGS. 4, 5A and 5B, description is given to an embodiment of the equivalent circuit wherein amorphous silicon is used as the materials for the inverter circuit and voltage divider circuit.

Amorphous silicon is a semiconductor film having photoconductivity and has been used as a switching element for photosensors and liquid crystal display. In this embodiment, an amorphous silicon film is used as a photoconductor, resistor and active layer of a thin film transistor. The manufacturing process thereof will be described below.

Gate electrodes 13 and 14 and a light blocking film 15 are formed on a glass substrate 20 in the thickness of 2000 Å by sputtering chrome, and is patterned as shown in FIG. 4. Then, silane (SiH4), ammonia (NH3) and nitrogen are mixed and reacted by glow discharge to form a film of silicon nitride in the thickness of 3000 Å which is to be used as a gate insulating film 21. By continuously reacting silane, amorphous silicon is formed in a thickness of 2000 Å. Then, by continuously mixing and reacting silane and phosphine (PH3), an n+amorphous silicon film containing a large amount of photophorus is formed on the surface in a thickness of 3000 Å. The film is patterned to form an active layer of a switching transistor 9, an active layer of a loading transistor 10, a photoconductor 11, and a resistor 12. The n+amorphous silicon film 22 is to be further patterned, and the film 22 is formed in order to effect an ohmic contact between the underlayer amorphous silicon and electrodes thereupon. Holes are bored in the film of silicon nitride 21 for the contact between the gate electrode 14 and the higher voltage electrode 16 and between the gate electrode 13 and the contact electrode 19 of the voltage divider circuit. Chrome is sputtered further in a thickness of 2000 Å, and patterned to form a higher voltage electrode 16, a lower voltage electrode 17 and electrodes 18 and 19. An interlayer insulating film 23 comprising silicon nitride is formed by the method similar to the one used for the silicon nitride film 21, and holes are bored thereupon for the contact between the electrode 18 and a pixel electrode 24. Upon the layer, aluminium is further deposited in a thickness of 2000 Å, and is patterned to form a pixel electrode 24 having light blocking and light reflecting properties. Liquid crystal 25 is sandwiched between thus-made rear substrate 20 and the front glass substrate 27 having an indium-tin-oxide (ITO) transparent electrode 26 to complete the liquid crystal light valve according to this invention. In this embodiment, a ferro-electric liquid crystal of quick response such as chiral smectic phase liquid crystal is used. Although it is not shown in the figure, a polarizer plate 20 similar to the prior art is provided on the front side glass substrate 27 so that the signal light enters the side of the rear glass substrate 20 while the projection light from the front glass substrate 27. As shown in the figure, orientation alignment films of liquid crystal having the type similar to the prior art are formed on the surfaces so as to contact the liquid crystal.

As is obvious from FIG. 5, the pixel electrodes 24 fully cover the two thin film transistors 3, 4, the photoconductor member 11 and the resistor 12, and therefore these elements are never illuminated by the projection light. As stated above, a portion of the resistor 12 is covered by the light blocking film 15 to be fully shielded from the signal light. Moreover, the two thin film transistors are free of the influence from the signal light as they have a gate electrodes 13 and 14 respectively. In this embodiment, there is formed an interspace between pixel electrodes which are adjacent to each other laterally. If the light leaking from the interspace presents a problem, it will be easily solved by providing a light blocking film to cover the interspace at the same time when the gate electrodes 13, 14 and the light blocking film 15 are formed.

Although the description is made above for this embodiment using amorphous silicon for the semiconductor material, the semiconductor material made be CdS or CdSe. The glass substrates may be replaced by quartz substrate or sapphire substrate and a single crystal silicon may be formed thereupon instead of amorphous silicon to achieve the same effect. The gate insulating film may be formed with silicon oxide instead of silicon nitride. In addition to the above materials, organic insulating materials such as polyimide may be used for the interlayer insulating film.

Figure 6:
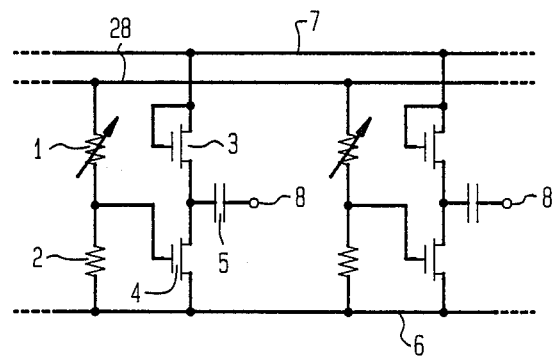
FIG. 6 shows an equivalent circuit diagram of another embodiment of the LCLV according to this invention.

FIG. 6 shows another embodiment of the equivalent circuit for the liquid crystal light valve according to this invention. The reference numeral 28 denotes an electrode which supplies voltage to the voltage divider circuit comprising the photoconductor 1 and the resistor 2. The circuit of this embodiment differ from the one shown in FIG. 2 in that it has separate power sources for the voltage divider circuit and the inverter circuit so that the threshold of the light signals and the voltage to be applied on the liquid crystal could be controlled separately.

For the signal light and the projection light in the present invention, He-Ne laser beams of the light in the visual radiation range is used for scanning or uniform irradiation.

One of problems encountered in the prior art of requiring an extensive time for manufacturing process may be easily solved by this invention which consumes only several fractions of the time needed by the conventional art. As described in the foregoing statement, the thickness of the thin films which are elements of this invention LCLV remains in the order of 3000 Å at maximum, and the gate insulating film, the amorphous silicon film and the n+amorphous silicon film may be formed continuously to greatly contribute to the reduction of time required for the formation of multilayer films.

A display contrast can be remarkably improved by this invention. While the changes in voltage applied to the liquid crystal is smaller in the prior art LCLV owing to the conventional device capacitor voltage dividers, this invention LCLV uses an inverter circuit to allow as much fluatuation in voltage as possible so far as the thin film transistors can stand the voltage. While the contrast obtained by the prior art LCLV was 8 or less, this invention liquid crystal light valve attains 20 to 30 easily.

As stated above, this invention enables easy manufacture of liquid crystal light valves which have a higher contrast, thus offering an extremely high industrial utility.

What is claimed is:

1. A liquid crystal light valve comprising: a first transparent insulating substrate provided with a plurality of light switching elements respectively connected to pixel electrodes, a second transparent insulating substrate provided with transparent electrodes, and a liquid crystal sandwiched between the first substrate and the second substrate, each of said light switching elements including a voltage divider circuit and an inverter circuit respectively connected between a high voltage terminal and a low voltage terminal, said voltage divider circuit comprising a photoconductor and a resistor element serially connected, an input terminal of said inverter circuit being connected to a node connecting said photoconductor and resistor element, and an output terminal of said inverter circuit being connected to said pixel electrodes.

2. The liquid crystal light valve as claimed in claim 1 wherein said inverter circuit comprises a switching thin film transistor element and a loading thin film transistor, source-drain paths of said switching and loading thin film transistors being connected in series, said switching thin film transistor having a first gate electrode connected to said node connecting said photoconductor and said resistor element, and said loading thin film transistor element having a second gate electrode connected to said high voltage terminal.

3. The liquid crystal light valve as claimed in claim 2 wherein the active areas of said photoconductor, resistor, and switching thin film transistor and the active areas of said loading thin film transistor are made of amorphous silicon, and said first and second gate electrodes are made of a conductive film having light blocking property, and said light blocking conductor film is sandwiched between said resistor and said first substrate.

4. A liquid crystal light valve comprising: first and second transparent plates, a liquid crystal layer formed between said first and second transparent plates, a transparent electrode formed between said first transparent plate and said liquid crystal layer, plural light reflective electrode layers formed between said second transparent plate and said liquid crystal layer, light switching elements formed between each of said light reflective electrode layers and said second transparent plate, and a light blocking film formed selectively between said light switching elements and said second transparent plate, said light switching elements respectively including a voltage divider circuit and an inverter circuit, said voltage divider circuit comprising a photoconductor layer and a non-photosensitive resistor layer serially connected to each other between a pair of wiring electrodes having a potential difference therebetween, said inverter circuit receiving the voltage divider by said divider circuit as an input, and the output from said inverter circuit being connected to the respective light reflective electrode layer so that the output from said divider circuit is controlled by the amount of the incident light on said photoconductor layer to thereby control the voltage applied on the respective light reflective electrode layer.

5. A liquid crystal light valve including a first conductive film formed on a first region of a first transparent insulating substrate, a first insulating film formed on said first conductive film, a resistor element layer formed on said first insulating film, a photoconductive layer formed on a second region of said first transparent insulating substrate, one end of said photoconductive layer being connected to an end of said resistor element layer via a first connection electrode layer, a switching thin film transistor element having an opaque first gate electrode layer formed on a third region of said first transparent insulating substrate, one end of said first gate electrode layer being connected to said first connection electrode layer, a loading thin film transistor element having an opaque second gate electrode layer formed on a fourth region of said first transparent insulating substrate, a high potential wiring connected in common to the other end of said photoconductive layer and a source of said loading thin film transistor element, a low potential wiring connected in common to the other end of said resistor element layer and a drain of said switching thin film transistor element, a second connection electrode layer connecting a drain of said loading thin film transistor element and a source of said switching thin film transistor element, a second insulating film formed across said resistor element layer, photoconductive layer, loading thin film transistor element and switching thin film transistor element, a pixel electrode layer formed on said second insulating film, one end of said pixel electrode layer being connecting to said second connection electrode layer, a second transparent insulating substrate provided with a transparent conductive film, and a liquid crystal layer filled between said transparent conductive film and said pixel electrode layer, whereby the light incident from outside of said first transparent insulating substrate is adapted to change the resistance of said photoconductive layer to thereby control the voltage impressed on said liquid crystal layer.

* * * * *